June 4, 1940.　　　B. O. MONTGOMERY　　　2,203,540
WEDDING CAKE COVER
Filed Oct. 23, 1936
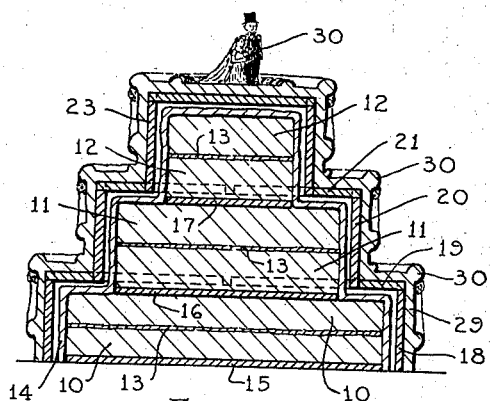
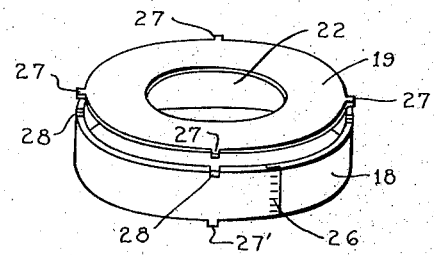
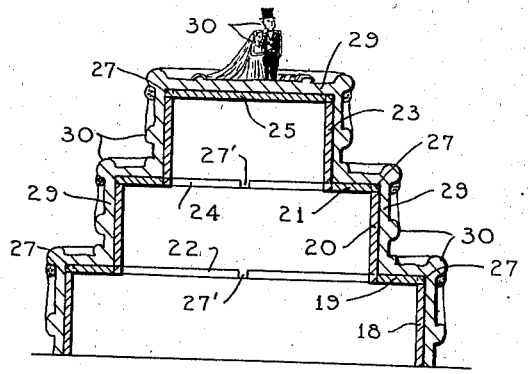
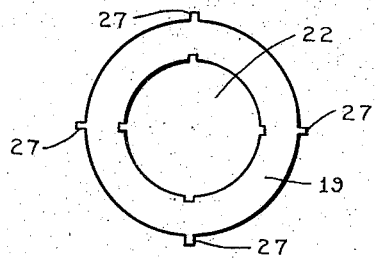
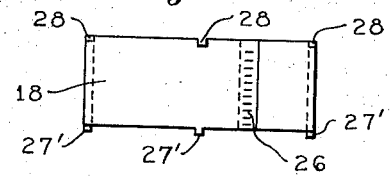
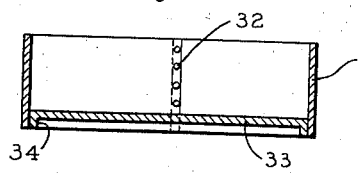
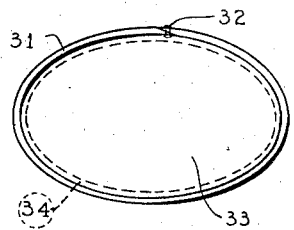
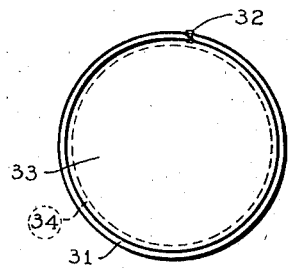
INVENTOR
BRYAN O. MONTGOMERY
BY Alfred R. Fuchs
ATTORNEY

UNITED STATES PATENT OFFICE 2,203,540

WEDDING CAKE COVER

Bryan O. Montgomery, Kansas City, Mo.

Application October 23, 1936, Serial No. 107,235

3 Claims. (Cl. 65—16)

My invention relates to decorated cakes, and more particularly to a wedding cake comprising a decorative covering and means for providing such a decorative covering, as well as means for baking a cake to conform to such a covering comprising a new and improved pan.

Wedding cakes and other fancy decorated cakes, particularly those of an elaborate type made up of a plurality of layers that are arranged in a stepped, or terraced, manner have required a large amount of time for decorating the same and inasmuch as such cakes cannot be prepared very long in advance of the use thereof, because the cake portion thereof would deteriorate, the ability of bakers, or caterers, to supply such highly decorative cakes as the stepped, or terraced, wedding cakes of the character above referred to, has been rather limited. This has made it impossible for bakers, or caterers, to accept orders for very many of such cakes to be completed within a brief period of time, or during any short time interval, because it was physically impossible to bake and decorate the cakes within the time in which delivery thereof was required. It is not uncommon at all for the decoration of a wedding cake to require eighteen hours' work on the same to complete the decoration thereof and it has been true that frequently as much as a week has been spent on the decoration of an elaborate wedding cake.

One of the purposes of my invention is to provide means for preparing a decorated wedding cake on short notice, this being accomplished by providing a false covering, or decorative outer covering for the cake that is stepped internally to conform with the stepped formation of the cake, and stepped externally in a similar manner to simulate the cake and which has a backing that is covered with a decorative coating, in the form of an icing.

Not only is the above mentioned advantage obtained by this kind of a device, but a cake is produced that is easier to cut properly and that is more desirable for eating purposes, because the fancy sugar coating that is provided on wedding cakes is usually so thick and so sweet that the majority of people that eat the cake leave the fancy frosting and eat only the cake portion. Also it has become customary in recent years to make this frosting, or icing, a butter cream frosting, which is better for eating purposes, but will not keep for any period of time and which is particularly difficult to work into a fancy form under high temperature conditions, due to the fact that the butter will tend to reach the melting point and it will be impossible to make the frosting conform to any particular shape and remain so. The difficulty with the usual thickly iced, heavily decorated, wedding cake in cutting the same, is that some support must be provided for the upper layers of the cake upon the lower layers, and it is customary to insert a disk-like piece of corrugated board on top of a lower tier of the cake, usually made up of a plurality of layers, to support the layers above that, this disk-like piece of corrugated board being of the size of the layers of the next tier of cake, and so on, to the top of the cake. The decorative frosting being thick and provided with a large amount of decoration, renders it difficult for the person that is cutting the cake to know just where these corrugated board supports are located, and in cutting the cake frequently the cake is damaged, if not ruined, by the person cutting the same without knowing the location of the corrugated board support. By providing the actual cake with a simple frosting, or icing, of the ordinary thickness and decorating the same comparatively simply, if it is to be decorated at all, the outline of the cake is maintained sufficiently that these corrugated board supports can be readily located and the cutting of the cake be accomplished easily.

Another advantage of my invention is that it is possible to decorate the false shells, or covers, of the cakes in advance when there is plenty of time for doing this and when the atmospheric conditions for working with the icing, or frosting, are the best to accomplish artistic work in the making of the decorated covering. The temperature, and also the humidity, must be right for this purpose and it is especially difficult to work with these decorative frostings, or icings, in hot weather, and to get these to set right. Also, of course, the decoration of a cake being a piece of artistic work, it depends considerably upon the attitude that the decorator of the cake may have toward the work at the time it is being done. In other words, the same person may be able to do a much more artistic job on one day than another. By providing the false covers and making it possible to decorate these ahead of time, or at times when conditions, as well as the temperament of the decorator are the best, better and more uniform results can be obtained. Also, since the frosting, or icing, is not to be eaten, a harder and more permanent frosting, or icing, can be used than that on the cake itself, an icing, or frosting, being, preferably, used that will set firm and hard and will remain so under all conditions after being set. The decorative covers can thus be made up in various styles ahead of time and placed in a dust-tight case for exhibition purposes, so that the person that wants to obtain such a decorated cake can see just what he is buying instead of having to depend on a description of the same, or picture of the same, as a guide for determining what kind of a product will be produced by the decorator after the order has been given for the same.

Another object of my invention is to provide a decorated covering for a cake of the above mentioned character, which is of a stepped formation and made of units of sheet material comprising top wall portions and curved side wall portions, the top wall portions serving to conform the side wall portions to a predetermined curved shape and being provided with means for temporarily connecting said top wall portions of each of the units of the side wall portions of such unit, and further to provide a covering of the above mentioned character having a backing made up of such units, which are capable of being shipped knocked down and set up in superposed relation, whereupon the frosting, or icing, is applied to fixedly secure the backing members together in stepped formation, said decorative covering, or frosting, thus serving not only as the decorative means, but means for forming a complete unit of the sectional backing and coating. Preferably, the side wall forming portions are made in an endless form and shipped in a folded condition, being, preferably, made of a material such as corrugated board, and the top wall forming portions are, preferably, made of similar material of such stiffness that the same will hold the side wall portions in a proper curve, either of an oval character, or circular character, to conform to the shape of the corresponding part of the stepped cake within the same. Preferably, the cake is so related to the covering that a slight space will be provided all around the cake so that it can be readily set on a support and the covering placed over it without damaging the cake or the frosting, or icing, on the cake.

It is another purpose of my invention to provide pans for baking the layers of which the various tiers of the cake are composed, which are of the appropriate height and contour and size, that the same will fit properly within the covering. In order to provide a set of pans for this purpose that will require a minimum number of parts, I provide flexible, preferably, resilient side wall portions for the pans, and detachable bottom portions for the same, which will shape the pans to the contour desired. The bottom portions are, preferably, made of two different contours, one of a circular outline and the other an oval, or substantially elliptical, outline with the perimeter of the oval and circular bottoms the same. Accordingly the same side wall portion or the endless band is the same distance around the same as the perimeter of either of said bottom portions and can be fitted around either the circular or oval bottom and will conform thereto to form either an oval or circular pan, as may be desired.

It is another important purpose of my invention to provide a set of knock-down backing members that are made up of annular top portions of either a circular, or oval, form with openings therein of the same shape as the peripheral edges thereof and of such size that the next smaller of such top wall members can be made of the material cut out of the next larger to form the opening in the next larger top wall member, thus avoiding any wastage of material in cutting the opening. Also if the type of pan is used that is referred to above, the side wall portions of the backing can all be made of standard size, that is, there would be a large, an intermediate, and a small sized side wall portion, which would fit either the circular or oval top wall portion of each unit of the backing, thus simplifying the manufacture of the backing and making it possible for the baker purchasing the knocked-down backings, to use the side wall portions thereof for either circular, or oval, or elliptical, cakes, as may be desired.

Other objects and advantages of my invention will appear as the description of the drawing proceeds. I desire to have it understood, however, that I do not intend to limit myself to the particular details shown or described, except as defined in the claims.

In the drawing:

Fig. 1 is a vertical sectional view through my improved wedding cake, comprising the cake and cover portion.

Fig. 2 is a similar view through the decorative false cover separate from the cake.

Fig. 3 is a perspective view of one of the backing units showing the top slightly spaced from the side wall portion thereof, or in the position which it would assume just before being placed in cooperative relation with the side wall portion, showing an oval, or elliptical, unit.

Fig. 4 is a plan view of a cover member for a circular type of backing unit.

Fig. 5 is a side elevation of the side wall portion of such a circular unit in set up condition.

Fig. 6 is a view of a side wall unit in folded, or knocked-down condition.

Fig. 7 is a vertical sectional view through my improved pan used in conjunction with my invention.

Fig. 8 is a top plan view of said pan used in conjunction with an oval, or elliptical, bottom portion, and Fig. 9 is a similar view of the pan used with a circular bottom portion.

Referring in detail to the drawing, in Fig. 1 is shown a wedding cake having the lower tier made up of the layers 10, an intermediate tier made up of the layers 11 and a top tier made up of the layers 12, the layers 10, 11 and 12 being all of a similar shape, but the layers 11 being smaller than the layers 10, and the layers 12 being correspondingly smaller than the layers 11 so as to provide a stepped, or terraced, form to the cake. A frosting, or filling, 13 may be provided between the layers, and a frosting, or icing, 14 covers the entire outer surface of all the layers, 10, 11 and 12 and this may be made plain, or with simple decorations, should decoration thereof be desired. The pans for making these layers are of such size that, shrinkage of the layers being taken into consideration, the frosting, or icing, 14 will not take up so much room that the decorative covering cannot be readily fitted over the same. It is customary to provide supporting members, which may be made of any suitable material, but are customarily made of corrugated board comprising the supporting members 15, 16 and 17, the member 15 being made of the same size and shape as the layers 10, the member 16 of the same size and shape as the layers 11 and the member 17 of the same size and shape as the layers 12, the members 15, 16 and 17 acting as supports and as means for distributing the weight of the upper layers on the lower layers so as to cause no warping or depression thereof.

My improved outer false decorative covering comprises a backing, which is, preferably, made of an upstanding endless side wall portion 18 and an annular top wall portion 19, which may be made either of an oval, or elliptical, character, as shown in Fig. 3, or of a circular character, as shown in Fig. 4. A similar but smaller upstanding side wall member 20 and top wall member 21 are provided, the side wall member 20 being of such size that it will fit on the top wall member 19 closely adjacent the edge of the opening 22 provided centrally in the top wall 19, said opening 22 conforming to the shape of the outer periphery of the top wall 19 so that said top wall forms an annular band of either circular or oval outline of uniform width around the opening 22. Mounted on the top wall 21 is an upstanding side wall 23, which conforms in shape to the edge of the opening 24 in the top wall 21 resting upon said top wall closely adjacent the edge of the opening 24, the opening 24 being similarly arranged to the opening 22, the member 21 being of such size that the outer periphery thereof will conform to the inner periphery, or edge, of the opening in the member 19, making it possible to make the member 21 out of the material left from cutting the opening in the member 19. The opening 24 is of similar shape to the opening 22 and is of such a size that the closed top wall 25 of the backing can be cut out of the same to form said top wall, thus avoiding all waste of material in making the top walls 19, 21 and 25.

The members 18 and 19 form a unit, as do the members 20 and 21 and the members 23 and 25, the same being, preferably, shipped flat, that is, all of the top wall members 19, 21 and 25 being shipped in a flat condition, it being possible to nest the same, if this is desired, and the members 18, 20 and 23 are, preferably, shipped flat, or in a folded condition, as shown in Fig. 6, being made in the form of an endless band and of a flexible material, such as fibrous material of the character known as fiber board, or corrugated board, such as is commonly used in boxes. The ends of the member forming each endless band-like side wall 18, 20 or 23, are secured together by fastening elements of any suitable character, such as that shown at 26 in Figs. 3 and 5. In order to properly position the top wall members on the side wall members and hold the same temporarily in fixed position to each other in setting up the backing made up of the units described above, tongues 27 may be provided on the top wall members, which are adapted to fit in notches 28 in the top edges of the side wall members, as shown in Figs. 3 and 5. It is, of course, understood that if the top wall members are all made out of the same sheet there would be small notches in the edges of the openings provided in the side walls where the tongues 27 of the next smaller top wall member have been cut therefrom, but this would do no harm whatsoever, as the side walls of the next higher unit will rest thereon and substantially cover the notches thus left. If desired, tongues 27' may be provided on the endless side wall members extending downwardly from the bottom edge thereof into the notches left in the next lower top wall to exactly locate the next higher unit relative to the one below it. If desired, the inner surfaces of the top and side wall members of these units may be provided with a coating that will prevent any odors, or undesirable flavors, from the material of which the backing is made, from reaching the cake placed within the same.

It will be noted that when these units of gradually decreasing size are placed on top of each other, whether of an oval or elliptical character, or of a circular character, these will form a stepped cover member offset internally in a terraced, or stepped, form to conform to the shape of the cake that is to be placed within the same, and stepped, or terraced, on the outer face thereof to simulate the cake within the same. A coating 29 of icing of a relatively hard character, which will set permanently, is, preferably, provided over the entire outer surface of the backing thus provided, and suitable decorations of any desired character, such as indicated at 30, may be provided on said coating, which may be made of as elaborate a character as may be desired. It will be obvious that these coverings, or false covers, can be made in advance and completely decorated ready for use with a relatively plain cake, such as that shown in Fig. 1, and that these can be subsequently used again on another cake, should this be desired, such as on wedding anniversary cakes, and so on.

Of course, suitable pans must be provided for making a cake that will properly fit the coverings described, and I accordingly provide a set of pans that will be of such shape and size as will produce layers that will be of a suitable size to be capable of being iced and placed within a cover such as I provide. Such a pan is shown in Fig. 7, and is provided with an endless flexible metallic side wall 31, which is made of sheet metal, which, preferably, has a somewhat resilient character, and which is readily deformable from one shape to another without being dented, or otherwise damaged. The ends of the piece of sheet metal forming this endless band-like side wall member 31 are, preferably, secured together in any suitable manner, as by means of securing elements 32. A bottom 33 is provided for the pan, which is merely slipped into the side wall 31, fitting the same tightly and is provided with a peripheral flange 34 for stiffening the bottom and aiding in causing the side wall 31 to conform to the shape of said flange and to the periphery of said bottom. In Fig. 8 is shown a bottom 33 of oval, or elliptical, form. The side wall is, however, so made that it can be placed in proper position on a bottom that is of the same perimeter as the bottom 33, and of other shapes, such as the circular bottom 33', which is provided with a flange 34 conforming to the shape of the periphery of the bottom 33', and it will be obvious that the side wall 31 being of a flexible character, can be slipped over the bottom 33' and a circular pan made of the side wall 31 and the bottom 33' instead of the oval pan made of the same side wall and the bottom 33. Of course, with the form of cake shown, if all of the layers for one cake are to be baked at once, six separate side wall members, two of each size, must be provided, and twelve bottom members, six of the shape of the member 33, and six of the shape of the member 33' so that two layers of each size of oval, or elliptical, shaped character can be made, or two layers of each size of circular character can be made, as may be found desirable.

It will be seen from the above that a simple and cheap backing, or support, is provided for the decorative coating of a wedding, or similar, cake, which can be readily set up and decorated by the baker, and which can be shipped economically and sold in sets along with the pans to provide a simple and efficient means for making up decorated cakes in advance of the time when the same are to be used, having the advantages to the baker that have been pointed out herein.

What I claim is:

1. A decorative cake covering of the character described, comprising a sectional backing made up of a plurality of similarly shaped units each having a vertical peripheral wall portion and a top wall portion, said units being arranged in superposed relation to each other and decreasing in size from the lowermost of said units to the uppermost of said units to form a stepped hollow support and a decorative covering over the outer surface of said backing securing said units together.

2. A decorative cake covering of the character described, comprising a sectional backing made up of a plurality of similarly shaped units each having a vertical peripheral wall portion and a top wall portion, said units being arranged in superposed relation to each other and decreasing in size from the lowermost of said units to the uppermost of said units to form a stepped hollow support, each of said top walls having an opening therein except that of the topmost unit, and a decorative covering over the outer surface of said backing securing said units together.

3. A decorative cake covering of the character described, comprising a backing made up of a plurality of superposed sections and comprising a lower section having a curved upstanding side wall and a top wall having a curved outer peripheral edge, said top wall having a central opening therein of similar shape to said curved peripheral edge thereof, and an upper section having a curved upstanding side wall mounted on the top wall of said lower section at the edge of said opening and conforming to the curvature of said openings, and having a top wall the outer peripheral edge of which is of the same outline as the opening in said lower section and a decorative covering over the outer surface of said backing and securing said sections together.

BRYAN O. MONTGOMERY.